July 9, 1935. G. A. STACKHOUSE 2,007,385
SPRING STRUCTURE
Filed May 9, 1934 2 Sheets-Sheet 1
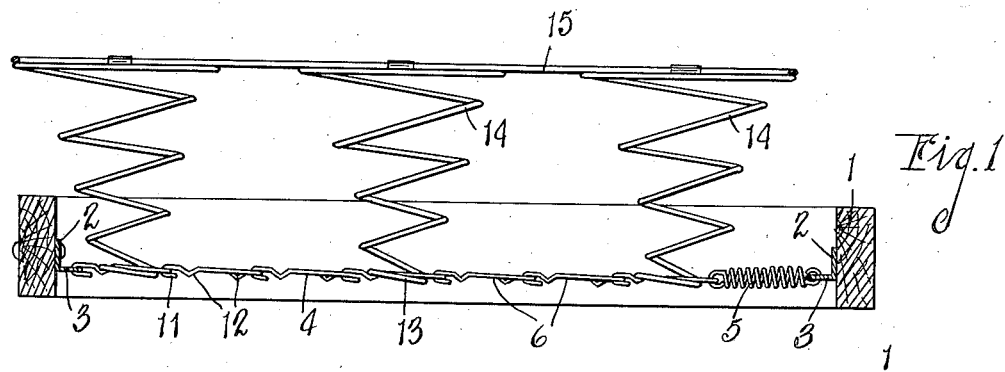
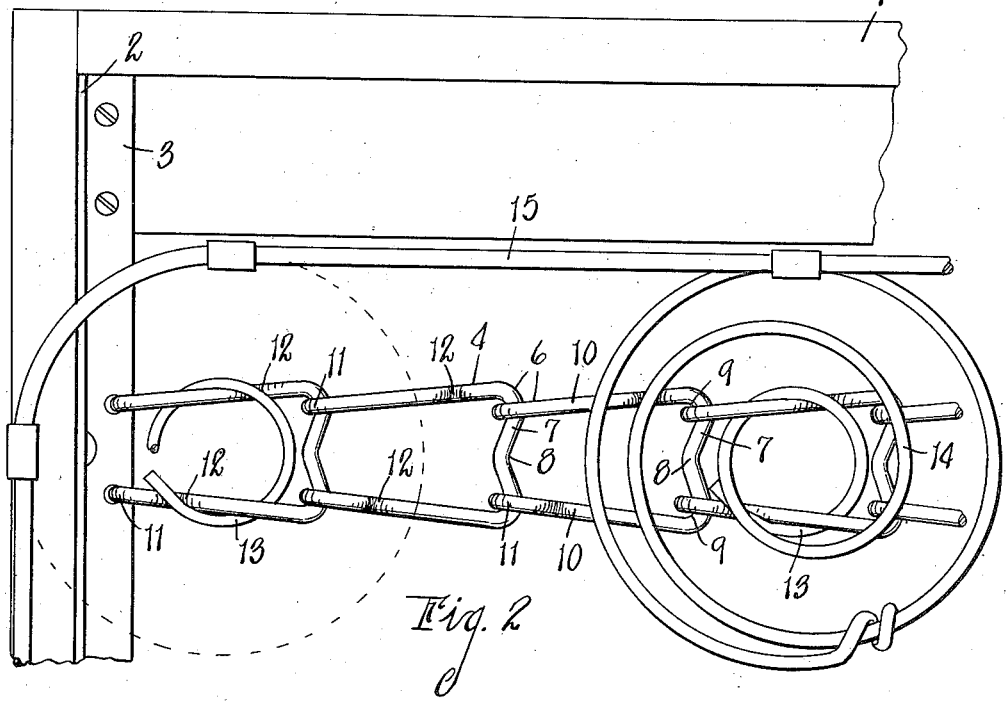
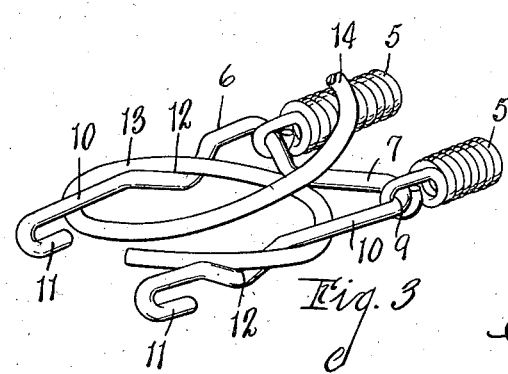
INVENTOR
George H. Stackhouse
BY
Chappell Earl
ATTORNEYS July 9, 1935.  G. A. STACKHOUSE  2,007,385
SPRING STRUCTURE
Filed May 9, 1934  2 Sheets-Sheet 2

INVENTOR.
George A. Stackhouse
BY Chappell & Earl
ATTORNEYS

Patented July 9, 1935

2,007,385

UNITED STATES PATENT OFFICE 2,007,385

SPRING STRUCTURE

George A. Stackhouse, Oakland, Calif., assignor to L. A. Young Spring and Wire Corporation, Detroit, Mich.

Application May 9, 1934, Serial No. 724,731

7 Claims. (Cl. 155—179)

The main objects of this invention are:

First, to provide an improved spring structure for upholstered furniture such as Chesterfields, chair seats and the like, utilizing helical body springs of the single-cone type.

Second, to provide a spring structure of this character having a base construction embodying improved transverse supports which are very flexible and well adapted for the purpose intended.

Third, to provide in a spring structure an improved spring support, which is flexible and non-extensible, very durable and enables rapid assembly of the springs.

Fourth, to provide a spring structure having the above desirable features and characteristics and which is simple and economical in its parts and very efficient and effective in operation.

Objects relating to details and economies of my invention will appear from the description to follow. The invention is defined and pointed out in the claims.

A structure which is a preferred embodiment of my invention is illustrated in the accompanying drawings, in which:

Fig. 1 is a view in transverse section of a spring structure embodying the features of my invention.

Fig. 2 is an enlarged fragmentary top plan view.

Fig. 3 is a fragmentary perspective view of the spring support of Figs. 1 and 2.

Figure 4:
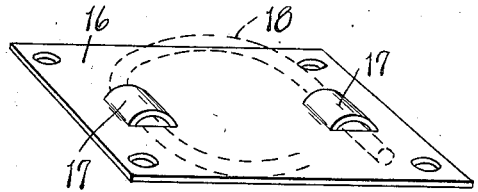
Fig. 4 is a fragmentary perspective view of a modification of the spring support in which the spring supporting links are in the form of plate-like stampings.

Referring to Figs. 1, 2 and 3 of the drawings, in the embodiment illustrated, numeral 1 indicates a frame having longitudinal angle bars 2, 2, secured to the inner side thereof to provide inwardly extending flanges 3, 3. I connect spaced flexible transverse supports 4 at their ends to these flanges, the supports severally comprising end springs 5, 5 and a series of links 6 hinged together for relative movement about longitudinal axes extending parallel to the longitudinal angle bars 2, 2 and transversely of the supports 4.

The links 6 are substantially U-shaped as shown, their cross members or bights 7 being bent up at 8 to provide recesses 9, 9 with their arms 10, 10. The arms are provided with end hooks 11, 11 engaging the recesses 9, 9 of the adjacent link. The arms of the links are provided with offsets 12, 12 constituting seats for the lower end coils 13 of the body springs 14.

The body springs are arranged on the supports 6 in spaced longitudinal rows, the body springs being in the form of single cones with their apex at the bottom as shown. The small lower end coils 13 of the body springs are interconnected with the arms of the links and engage the offsets 12. The large upper end coils 14 are connected in any suitable manner to the wire frame 15.

The offsets are preferably disposed out of alignment, as shown in Figs. 1 to 3, so that the lower coils of the conical springs can be readily threaded into engagement with the arms of the links with portions thereof engaged within the offsets under tension, thus locking or retaining the springs in engagement with the links and positioning them so that they cannot slip about upon the links.

By the use of single-cone coils for the body springs, I use considerably less wire than in the double-cone type. By making the transverse supports in the form of a chain, I not only reduce the cost of manufacture over the webbing previously used for this purpose, but also provide a structure which is much quicker to assemble and one which is very flexible and durable. Further, in my construction of the base, longitudinal cross ties are entirely eliminated. I also greatly reduce the number of coils required for the structure.

In Fig. 4 of the drawings, I show a plate-like link 16 having loop-like offsets 17, 17 for securing the bottom coil 18 of the body spring at opposite sides thereof. The link 16 is one of a series, the links being hinged together by means of hooks (not shown) or by means of similar links.

Figure 5:
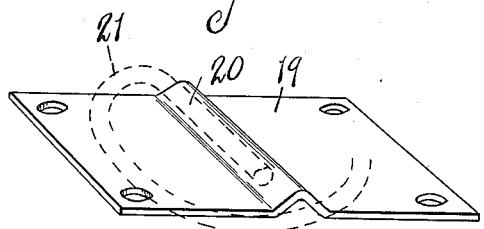
Fig. 5 is a perspective view of another modification of the same general character or type.

In Fig. 5, I show a variation of the plate-like link, in this case the link 19 being provided with a single loop-like offset 20 for receiving the lower end coil 21 of the body spring, the latter being bent to provide a prong, as shown.

Figure 6:
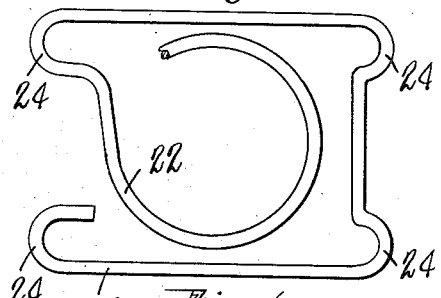
Fig. 6 is a fragmentary top plan view of another modification in which the support links are formed integrally with the body springs.

In Fig. 6, I show a construction in which the lower coil 22 of the body spring is conformed to provide one of a series of links which are connected substantially as described above in connection with Figs. 4 and 5. In the modification, the lower end coil is formed to provide a substantially rectangular link 23 having corner loops 24 for coaction with the hooks of connecting links or helicals.

Figure 7:
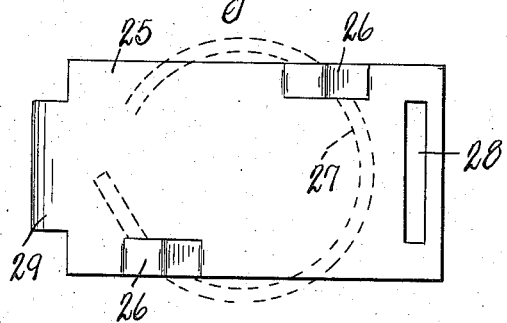
Fig. 7 is a fragmentary top plan view of another modification of the plate-like type of spring supporting link.

In Fig. 7, I show another variation of the plate-like link construction in which the link 25 is provided with transversely arranged loop-like offsets 26, 26 for coaction with the lower end coil 27 of the body spring which is in its undeformed shape. The link 25 forms one of a series of links having a slot 28 at one end and a hook 29 at the other providing longitudinal axes for relative movement of the links.

In the embodiments of Figs. 4, 5, 6 and 7, the coils of the body springs are also engaged with the offset under tension so that the springs are held in suitable relation and against displacement.

From the above description of my invention, it will be appreciated by those skilled in the art that I provide a spring structure of the character set forth which is extremely simple and economical in its parts yet which is durable and flexible and well adapted for the purpose intended.

I have illustrated and described my improvements in embodiments which I have found very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent, is:

1. In a spring construction of the character set forth, supports comprising a series of links of substantially U-shape having their cross members bent up to provide recesses with their arms, the arms having end hooks engaging the recesses of adjacent links, the arms of certain of the links being bent medially of their ends to provide oppositely facing coil securing offsets, and conical body springs arranged on said supports with their small lower end coils engaging the arms of the links in said offsets.

2. In a spring construction, the combination of a support comprising a series of U-shaped links having their bights conformed to provide recesses and having their arms terminating in hooks secured to the recessed bight portions of adjacent links, the arms of the links having downward offsets therein disposed in non-aligned relation, and conical body springs having their lower end coils threaded into engagement with the arms of the links with portions thereof engaging the top and bottom and opposite sides of the links under stress, the portions engaging the upper sides of the links being within the said recesses.

3. In a spring construction, the combination of a support comprising a series of U-shaped links having their arms terminating in hooks secured to the bight portions of adjacent links, the arms of the links having downward offsets therein disposed in non-aligned relation, and conical body springs having their lower end coils threaded into engagement with the arms of the links with portions thereof engaging the top, bottom and opposite sides of the links under stress, the portions engaging the upper sides of the links being within the said recesses.

4. In a spring construction, the combination of a support comprising a series of U-shaped links having their arms terminating in hooks secured to the bight portions of adjacent links, the arms of the links having downward offsets therein disposed in non-aligned relation, and coiled body springs, each body spring having threaded engagement with the arms of a link and engaging the offset thereof under tension whereby the spring is supported in upright relation to the link.

5. In a spring construction of the character set forth, a flexible support comprising a series of articulated links having offset portions intermediate their ends, and coiled body springs mounted on said links and having diametral portions of their bottom coils engaged in said offset portions thereof under tension whereby the springs are securely retained in upright position on the links.

6. In a spring construction of the character set forth, a support comprising a series of articulated links bent medially of their ends to provide coiled body spring securing offsets, and body springs supported by said links and with terminal portions thereof in retaining engagement with said offsets.

7. In a spring construction of the character set forth, a support comprising a series of articulated links bent medially of their ends to provide spring securing recesses, and body springs individually mounted on the links with their lower end coils engaging said recesses.

GEORGE A. STACKHOUSE.